Aug. 22, 1961

E. H. LAND 2,997,390

NOVEL COLOR PROCESSES AND PRODUCTS

Filed Sept. 4, 1956

INVENTOR.
Edwin H. Land
BY Brown and Mikulka
and
Stanley H. Mervis
ATTORNEYS

United States Patent Office 2,997,390
Patented Aug. 22, 1961

2,997,390
NOVEL COLOR PROCESSES AND PRODUCTS
Edwin H. Land, Cambridge, Mass., assignor to Polaroid Corporation, Cambridge, Mass., a corporation of Delaware
Filed Sept. 4, 1956, Ser. No. 607,820
24 Claims. (Cl. 96—29)

This invention relates to photography, and more particularly to improved processes and products for obtaining color images by diffusion-transfer reversal processes.

Various methods of forming color images by a diffusion-transfer reversal process have been proposed. Thus, U.S. Patent No. 2,647,049, issued to Edwin H. Land on July 28, 1953, proposes the use of color couplers and color developers such as are employed in conventional color processes. Another diffusion-transfer reversal color process, as disclosed and claimed in the copending application of Howard G. Rogers, Serial No. 415,073, filed March 9, 1954, and now abandoned in favor of a continuation-in-part thereof, Serial No. 748,421, filed July 14, 1958, proposes to employ dye developers, that is, complete dyes which possess a silver halide developing function. It has also been proposed to utilize complete dyes in diffusion-transfer reversal color processes by employing an oxidation product of the silver halide developer to immobilize the dye in exposed areas, dye present in unexposed areas being free to transfer. Processes of this type are disclosed and claimed in the co-pending application of Howard G. Rogers, Serial No. 358,012, filed May 28, 1953, now U.S. Patent No. 2,774,668, issued December 18, 1956, and in a continuation-in-part thereof, Serial No. 613,691, filed October 3, 1956.

In processes of the type described, it is frequently desirable to place the color-providing substance in an emulsion layer, or in the case of a multilayer material, in front of an emulsion layer. Such a procedure results in a loss of speed due to light absorption by the colored color-providing substance. This undesirable light absorption reduces the amount of light available for exposure of the emulsion in which the color-providing substance is contained as well as the light available for exposure of any emulsion behind it.

The present invention is concerned with improvements in the formation of color images by diffusion-transfer reversal processes, and particularly with reducing undesired light absorption by the color-providing substances present.

A primary object of this invention, therefore, is to provide diffusion-transfer reversal color processes wherein light absorption by a color-providing substance is substantially reduced, and suitable photographic products for use in such processes.

A further object of this invention is to provide increased speed in diffusion-transfer reversal color processes.

Another object of this invention is to provide diffusion-transfer reversal processes utilizing color-providing substances in a form capable of exhibiting dischroism.

A further object of this invention is to provide diffusion-transfer reversal processes utilizing dichroic color-providing substances.

Another object of this invention is to provide diffusion-transfer reversal color processes utilizing color-providing substances in the form of polarizing crystals.

These and further objects of the invention will in part be obvious and will in part appear hereinafter.

The invention accordingly comprises the processes involving the several steps and the relation and order of one or more of such steps with respect to each of the others, and the products possessing the features, properties and the relation of elements which are exemplified in the following detailed disclosure, and the scope of the application of which will be indicated in the claims.

For a fuller understanding of the nature and objects of the invention, reference should be had to the following detailed disclosure taken in connection with the accompanying drawing wherein.

Figure 1:
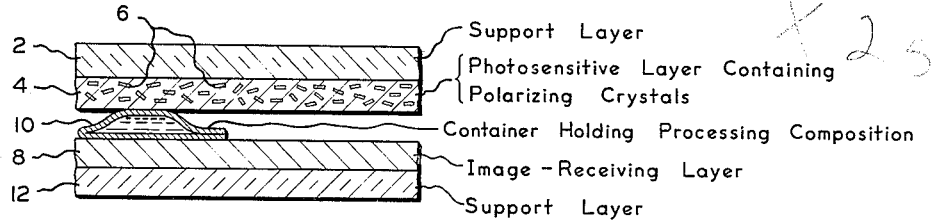
FIGURE 1 is a diagrammatic cross-sectional view of one embodiment of a photosensitive element, suitable for use in the process of this invention, in association with an image-receiving element and a rupturable container holding a liquid processing composition.

In diffusion-transfer reversal processes of the type herein contemplated, an exposed photosensitive silver halide emulsion layer containing a latent image is processed by a liquid processing composition to develop the latent image and also to obtain an imagewise distribution of a diffusible color-providing substance. A positive color image may be obtained by the transfer of at least part of such imagewise distribution of diffusible color-providing substance, by imbibition, from the developed photosensitive layer to a superposed image-receiving material. The desired positive color image is revealed by separating or stripping the image-receiving material from the developed photosensitive layer after a suitable imbibition period.

In monochromatic diffusion-transfer reversal processes, a colored color-providing substance may be incorporated in the photosensitive element in a layer behind the silver halide emulsion stratum, thereby avoiding undesired light absorption by the color-providing substance. Frequently, however, it is desirable to utilize the colored color-providing substance in the silver halide emulsion. In such a case, as in the case of a multilayer photosensitive element, it has been found that the colored color-providing substance absorbs part of the light otherwise available for exposure, thus reducing the speed of the photosensitive element.

I have now discovered that this undesired light absorption by a colored color-providing substance may be substantially reduced by utilizing the colored color-providing substance in a form capable of exhibiting dichroism. The use of color-providing substances in a dichroic state substantially reduces the absorption power of the color-providing substance and permits more light to pass through to lower portions of the emulsion containing the color-providing substance as well as to lower emulsion strata of a multilayer photosensitive element.

The color-providing substances may be employed in the form of polarizing crystals or molecularly oriented and dispersed in a suitable carrier medium whereby they exhibit dichroism.

The term "dichroism" is used herein and in the claims as meaning the property of differential absorption of the components of an incident beam of light, depending upon the vibration directions of said components. By a "dichroic" color-providing substance is meant a color-providing substance which possesses the property of showing dichroism. In the practice of this invention this property of dichroism is displayed when such dichroic color-providing substances are incorporated in molecularly oriented mediums or are present in the form of polarizing crystals.

Dichroic color-providing substances molecularly dispersed in a carrier medium whose molecules have been oriented to substantial parallelism will exhibit a light absorption of the order of one-half that of the same color-providing substance molecularly dispersed in a non-oriented carrier.

A decrease in light absorption may be obtained by using a color-providing substance in the form of particles, such as chunks or crystals. I have found that the light absorbed by such particles of color-providing substances may be further reduced by employing polarizing crystals of the color-providing substances.

Polarizing crystals of color-providing substances transmit light vibrating in the plane of orientation of the crystal. As a result, light absorption of a crystal of a colored color-providing substance will be reduced and more light will be available for exposure of the silver halide emulsion.

Randomly oriented polarizing crystals of a colored color-providing substance, in a layer one crystal thick, will exhibit a light absorption of the order of one-half that of the color-providing substance in the form of particles such as chunks or crystals. Where the layer of polarizing crystals is more than one crystal thick, and the crystals are randomly oriented, the light absorption will be decreased although not as much as if the crystals were oriented since some crystals will be crossed.

Polarizing crystals of a color-providing substance, fully oriented in the plane of the film, will exhibit a light absorption of the order of one-half that of the color-providing substance in the form of particles.

While the reduced light absorption values given above are obtainable with the most efficient dichroic color-providing substances and represent maximum values, significant and useful decreased light absorption may be obtained with less efficient dichroic color-providing substances. It is also contemplated to employ polarizing crystals which polarize light of a wave length other than that corresponding to the absorption peak of the color-providing substance.

The polarizing crystals are of a range of small sizes selected to provide the optimum, i.e., minimum, low covering power consistent with high resolution. A suitable crystal size is of the order of about 3 microns or smaller. Crystals of this size exhibit a greater covering power than do larger crystals and therefore provide greater increased transmissions by being used in the form of polarizing crystals. It is desirable that the light striking the emulsion not be scattered in the course of transmission. Thus, the index of refraction of light transmitted by the crystal should approximately match the index of refraction of the emulsion and/or suspending medium, e.g., gelatin, cellulose acetate, etc.

The polarizing crystals may be of any shape where orientation is not desired. Where they are intended to be fully oriented for maximum decreased light absorption, the crystals should be needle-shaped or in any event elongated and of a length, in the direction of the elongated or needle axes, exceeding the wave lengths of light to be absorbed. The particles preferably have one dimension shorter than the wave lengths of the light to be absorbed. If particles of this type are oriented with their needle axes parallel in the suspending medium, the suspension will substantially absorb that component of the incident light vibrating in the direction of orientation of the needle axes and will transmit the component vibrating at right angles thereto.

The increased light transmission obtained in accordance with this invention may be illustrated by using an oriented, dichroic color-providing substance. The average absorption coefficient $d$ of a dichroic medium is defined as $$d = \tfrac{1}{3}(2d_\perp + d_\parallel)$$

where $d_\perp$ and $d_\parallel$ are the densities of the light rays vibrating perpendicular and parallel, respectively, to the axis of orientation. The unoriented transmission, $T_u$, is $$T_u = e^{-\tfrac{1}{3}(2d_\perp + d_\parallel)}$$

and the oriented transmission, $T_o$, is $$T_o = \tfrac{1}{2}[e^{-\tfrac{1}{2}d_\perp} + e^{-\tfrac{1}{2}d_\parallel}]$$

Knowing the dichroic ratio $$DR = \frac{d_\parallel}{d_\perp}$$

and the unoriented transmission, one may determine the oriented transmission.

The following table illustrates the increased light transmission obtainable.

| DR | $T_u$, percent | $T_o$, percent |
|---|---|---|
| 10 | 1 | 16.0 |
| 10 | 3 | 21.0 |
| 10 | 5 | 24.0 |
| 15 | 1 | 22.5 |
| 15 | 3 | 27.0 |
| 15 | 5 | 29.5 |
| 20 | 1 | 27.0 |
| 20 | 3 | 31.0 |
| 20 | 5 | 33.2 |
| 25 | 1 | 30.4 |
| 25 | 3 | 34.0 |
| 25 | 5 | 35.8 |

The expression "color-providing substances" as used herein is intended to include all types of colored reagents which may be utilized to produce a color image and which are soluble, or capable of being rendered soluble, in a processing composition so as to be transferable to an image-receiving material. They may be referred to as dyes and dye intermediates. The color-providing substances may initially possess a chromophoric system imparting the desired color in the state in which they are diffusible, or they may undergo reaction after transfer to form such a chromophoric system, as by oxidation and/or coupling. In a preferred embodiment, the color-providing substances are complete dyes which possess a silver halide developing function, i.e., they are dye developers, such as described in the aforementioned application of Howard G. Rogers, Serial No. 415,073.

Other suitable color-providing substances include coupling dyes, i.e., complete dyes which are capable of coupling with an oxidation product of a developing agent, e.g., diethyl p-phenylene diamine, to form an immobile dye. The desired imagewise distribution of diffusible color-providing substance results from the immobilization of the coupling dye in situ with the developed image as a result of the coupling reaction. Preferably, the coupling dye possesses the requisite color and may be utilized in the image-receiving layer without further reaction.

It is further contemplated to utilize, as a color-providing substance, a complete dye which is immobilized by tanning or otherwise reducing the permeability of the emulsion by oxidized developer, whereby outward diffusion is prevented.

The use of color couplers, which are themselves colored, and color developers is also contemplated within the scope of this invention. Preferred couplers for this embodiment are those which form azomethine, indoaniline and indophenol dyes when reacted with a silver halide color developer in the presence of an oxidizing agent. Such couplers may comprise nitriles, acyl nitriles, thioindoxyls, cyanoacetanilides, pyrazolones, phenols, naphthols, substituted ketones, esters and acyl acetanilides.

Suitable silver halide color developers for use with the just-mentioned couplers comprise such developing agents as the p-phenylene diamines and others characterized by their ability when oxidized to condense with couplers to form dyes of the above types. Combinations of color developers and couplers which form the least mobile dyes are preferred since such combinations give the cleanest highlights and the sharpest detail to the positive image. As an illustrative example of a color developer with which the invention may be practiced, mention may be made of 2-amino-5-diethylamino toluene.

Where color-providing substances are utilized which require oxidation to provide the desired color for the positive image, this oxidation may be effected by aerial oxidation after diffusion. Preferably, the image-receiving element has incorporated therein an oxidizing agent for the purpose of speeding up dye image formation, and providing full image density immediately upon stripping. The incorporation of an oxidizing agent in the image-receiving element is described in U.S. Patent No. 2,559,643, issued to Edwin H. Land. As examples of suitable oxidizing agents, mention may be made of peroxy compounds such as sodium or potassium perborate, and compounds having polyvalent metallic elements in higher valent form, such as copper, iron or cerium, wherein the metallic element is in higher valent form. Examples of these latter-mentioned agents are cupric salts such as cupric sulfate. Another suitable oxidizing agent is benzoyl peroxide.

In addition to the above-mentioned types of color-providing substances which are rendered immobile or nondiffusible in exposed areas, the expression "color-providing substances" is intended to include color-providing substances which are initially immobile or nondiffusible and which are rendered mobile or diffusible during processing, for example, by the action of unexhausted developing agent in unexposed areas. Color-providing substances of this type include reducible color-providing substances such as indophenols, quinone forms of dyes, such as the quinoid forms of hydroquinonyl dye developers, etc. The use of reducible color-providing substances in diffusion-transfer reversal processes is disclosed and claimed in the copending application of Howard G. Rogers, Serial No. 599,122, filed July 20, 1956, now abandoned in favor of a continuation-in-part application, Serial No. 825,359, filed July 6, 1959.

As examples of color-providing substances suitable for use in the processes of this invention, mention may be made of dye developers such as (I)

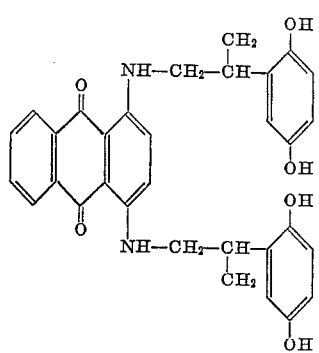

1,4-bis-[β-(2′,5′ - dihydroxyphenyl) - propylamino] - anthraquinone—cyan (II)

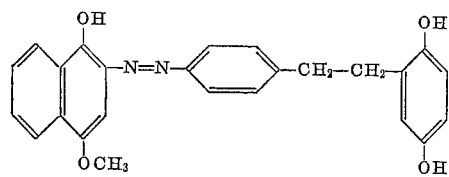

2-[p-(2′,5′-dihydroxyphenethyl)-phenylazo] - 4 - methoxy - 1-naphthol—magneta (III)

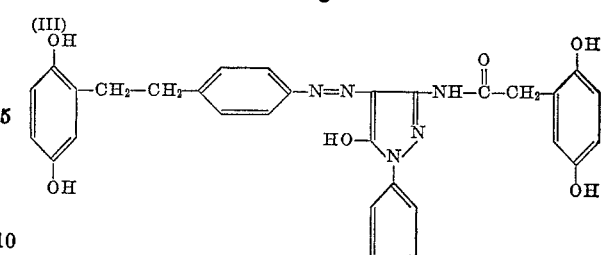

1-phenyl-3-homogentisamido-4-[p-(2′,5′-dihydroxyphenethyl)-phenylazo]-5-pyrazolone—yellow The above-mentioned dye developers have been found to crystallize to yield polarizing crystals.

Color-providing substances may be incorporated in crystal form in an emulsion by dissolving in an organic solvent, e.g., acetone, and adding this solution to gelatin. This mixture is stirred and heated, preferably under vacuum, to remove the solvent. Keeping the solvent concentration very low, the color-providing substance is precipitated in crystals of very small diameter. The resulting suspension is added to a silver halide emulsion and the emulsion layer is cast in the usual manner. By way of illustration, a suspension obtained using 1 gram of a dye developer may be added to approximately 50 cc. of a suitable silver halide emulsion.

Another method of providing polarizing crystals of a color-providing substance is to dissolve the color-providing substance in alkali in the presence of a protective colloid, e.g., gelatin, neutralize the alkali to precipitate the crystals and add this suspension to a silver halide emulsion.

In certain instances, polarizing crystals of color-providing substances which ordinarily do not form polarizing crystals may be obtained by crystallizing with another substance.

The polarizing crystals of the color-providing substance may be oriented in several ways. A degree of orientation is derived from the coating operation, where the crystals are in the form of plates, as a result of the shrinkage in thickness of the layer. For maximum orientation, the crystals should be needle-shaped.

If a suspension of needle-shaped polarizing crystals is spread in a thin layer by a doctor blade, and particularly a highly concentrated suspension of such crystals, the needle-shaped crystals will be oriented to substantial parallelism, as described in U.S. Patent No. 2,289,713, issued to Edwin H. Land on July 14, 1942. Repeated stroking of such a thin layer will increase the degree of orientation.

The crystals may also be oriented by extrusion or stretching. In an extrusion operation, a very viscous mixture of the carrier and crystals is extruded through slot to form a film or layer. If orientation by stretching is desired, a free film of the carrier and crystals may be formed, stretched and laminated to a base. Alternatively, the layer of polarizing crystals may be cast on a stretchable base which is then stretched and heated, if necessary, to set.

As previously mentioned, decreased light absorption may be obtained using dichroic color-providing substances molecularly dispersed in an oriented medium. Suitable media comprise polymeric plastics dyeable by the dichroic color-providing substances and which possess a relatively high tensile strength so as to permit the orientation of the molecules thereof. The material comprising the image-receiving stratum should preferably exhibit a higher affinity for the color-providing substance than does the carrier medium.

Polymers characterized by having a multiplicity of hydroxyl groups extending off the main polymer chain and consisting of simple repetitive groupings or units are generally useful as carriers for dichroic color-providing substances in accordance with this invention. Examples thereof are polyvinyl alcohol, polyhdroxy alkanes, partially hydrolyzed polyvinyl acetals and polyvinyl alcohol ester, regenerated cellulose, etc. In addition, other plastics such as suitably prepared polyamides or nylon-type plastics may be employed for carrier materials. Of the plastics herein named, polyvinyl alcohol is preferred.

Orientation of plastic carriers, such as just described, may be effected, for example, by stretching a sheet or film thereof until the molecules are sufficiently oriented. Orientation may be effected before or after incorporation therein of a dichroic color-providing substance.

Silver halide emulsions employing an orientable carrier medium, e.g., polyvinyl alcohol, are well known in the photographic art. See, for example, U.S. Patent No. 2,458,168, issued January 4, 1949, to Helen P. Husek. French Patent 925,019 discloses dyed, oriented emulsion layers for use in silver-dye-bleach processes for the purpose of preparing polarizing images in the emulsion layer.

The dichroic color-providing substance may be incorporated in the orientable medium before or after orientation is effected. A suitable carrier of this type may be dyed, by imbibition, from an acetone-water solution of the dichroic color-providing substance, excess solution being wiped off and the dyed carrier being allowed to dry.

Alternatively, an orientable emulsion layer may be obtained by incorporating a dichroic color-providing substance therein in a solution of water and an organic solvent, e.g., methyl Cellosolve, casting a layer thereof, allowing the layer to dry and orienting the layer by stretching. In such an embodiment, it is preferred that the dichroic color-providing substance be one which is compatible with the carrier medium, e.g., polyvinyl alcohol, to reduce any crystallization of the color-providing substance.

The dye developers of Formulae II and III, above, have been found to be particularly suitable for use in oriented emulsion layers.

The color-providing substance may be applied in a molecularly dispersed condition to an oriented medium, e.g., polyvinyl alcohol, ramie, etc., to provide discrete, dichroic elements, such as fibres of the oriented carrier, and such discrete, dichroic elements may then be incorporated in an emulsion stratum comprising, for example, silver halide and gelatin. The orientable medium may be oriented before or after application of the color-providing substance. The discrete elements may be filaments or may be formed, for example, by shredding, breaking, chopping, etc., a film of the orientable carrier, before or after orientation or incorporation of the color-providing substance, into discrete portions of desired size. Suitable precautions should be taken to avoid dissolving the color-providing substance from the oriented carrier when incorporating the dichroic elements into the silver halide emulsion.

Although this invention has been illustrated by the use of color-providing substances in a dichroic state in an emulsion, it is to be understood that use thereof in an emulsion is essential only for monochromatic embodiments. While this technique is preferred in multi-layer embodiments, dichroic color-providing substances may be used in a layer behind an emulsion layer to obtain increased light transmission to lower emulsion layers.

In the preferred embodiments of multilayer photosensitive elements, the dichroic color-providing substances associated with each emulsion are oriented in a common direction. In certain instances, use of a plurality of layers of a color-providing substance may give better transmittance than would be obtained with the same total quantity of color-providing substance in a single layer.

In carrying out the process of this invention, a photosensitive element is exposed and developed by application of a processing composition. The exposed photosensitive element is brought into superposed relationship, during or after application of the processing composition, with an image-receiving element including a stratum of a dyeable material. The appropriate color-providing substance is initially disposed in the silver halide emulsion stratum of the photosensitive element. In the case of a multilayer photosensitive element, however, a color-providing substance may be disposed in or behind its associated emulsion stratum. Processing of the exposed photosensitive element results in the immobilization of the color-providing substance in the exposed areas and the formation of an imagewise distribution of mobile or diffusible color-providing substance. At least a portion of this imagewise distribution of color-providing substance is transferred, by imbibition, to the superposed image-receiving element. The positive image is revealed by separating, or stripping apart, the superposed photosensitive and image-receiving elements after a suitable imbibition period, for example approximately one minute.

Suitable photosensitive elements employing color-providing substances in a dichroic state in accordance with this invention are illustrated in the accompanying drawing.

Referring to FIG. 1, there is shown a photosensitive element comprising a suport layer 2 carrying a photosensitive layer 4 comprising a silver halide emulsion and polarizing crystals 6 of a color-providing substance. An image-receiving element comprises a support layer 12 and a layer 8 of an image-receiving material. Positioned between the superposed photosensitive element and image-receiving element is a rupturable container 10 holding a fluid processing composition. This rupturable container 10 is adapted to release the processing composition, upon application of pressure, for spreading in a thin layer between the superposed photosensitive and image-receiving elements.

Figure 2:
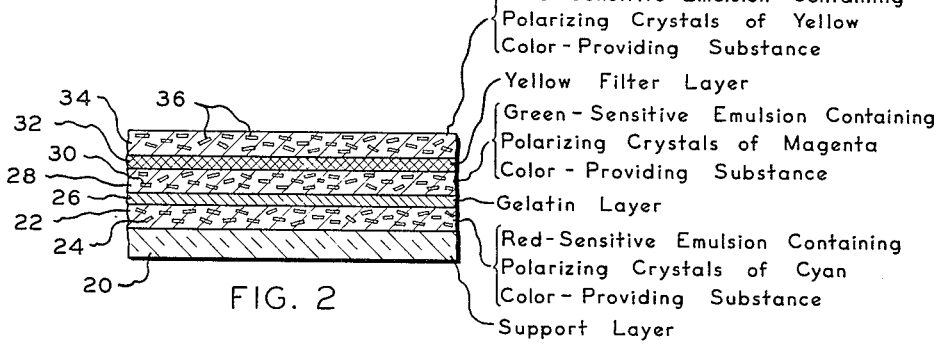
FIG. 2 is a diagrammatic cross-sectional view of a multilayer embodiment of a photosensitive element in accordance with this invention.

As mentioned above, the concepts of this invention are also applicable to multilayer photosensitive elements. An example of a suitable multilayer negative element is shown in FIG. 2, wherein a support 20 carries superposed emulsion layers 22, 28 and 34 respectively sensitized to red, green and blue portions of the spectrum. These emulsion layers 22, 28 and 34 contain particles 24, 30 and 36 of cyan, magenta and yellow color-providing substances, respectively. The green- and red-sensitized emulsions may be separated from each other by an interlayer 26, e.g., of gelatin, and from the blue-sensitive emulsion by a suitable yellow filter layer 32. In certain instances, the yellow filter may be omitted and an interlayer, e.g., of gelatin, may be used between the green- and blue-sensitive emulsions. Such multilayer photosensitive elements are suitable for use in the processes disclosed and claimed in the copending application of Edwin H. Land and Howard G. Rogers, Serial No. 565,135, filed February 13, 1956.

Polarizing crystals of color-providing substances may also be employed in photosensitive elements comprising a plurality of light-sensitive elemental portions of minute size mounted in side-by-side relation upon a suitable support in a color screen pattern. Diffusion-transfer reversal color processes employing such screen elements, as well as methods of preparing such screen photosensitive elements, are set forth in the copending applications of Howard G. Rogers, Serial No. 415,073, filed March 9, 1954 (now abandoned in favor of a continuation-in-part thereof, Serial No. 748,421, filed July 14, 1958), and Serial No. 577,711, filed April 12, 1956, and the copending application of Edwin H. Land, Serial No. 448,441, filed August 9, 1954, now U.S. Patent No. 2,968,554, issued January 17, 1961.

One such multicolor, screen negative or photosensitive element formed in accordance with the procedures described in said copending application of Howard G. Rogers, Serial No. 577,711, is shown in FIG. 3 as comprising a support 40 having thereon three sets of selectively blue-, green- and red-sensitive elemental portions, 500, 600 and 700, respectively, wherein the individual blue-sensitive portions 500 are illustrated in space relation to each other and with the selectively green- and red-sensitive portions 600 and 700 interspersed therebetween in inlaid relation.

Each selectively sensitive portion includes a photosensitive silver halide emulsion and the appropriate color-providing substance in the form of polarizing crystals. Any additional reagents necessary to provide development and positive image formation may be contained in the same stratum or in another stratum under the emulsion stratum.

Figure 3:
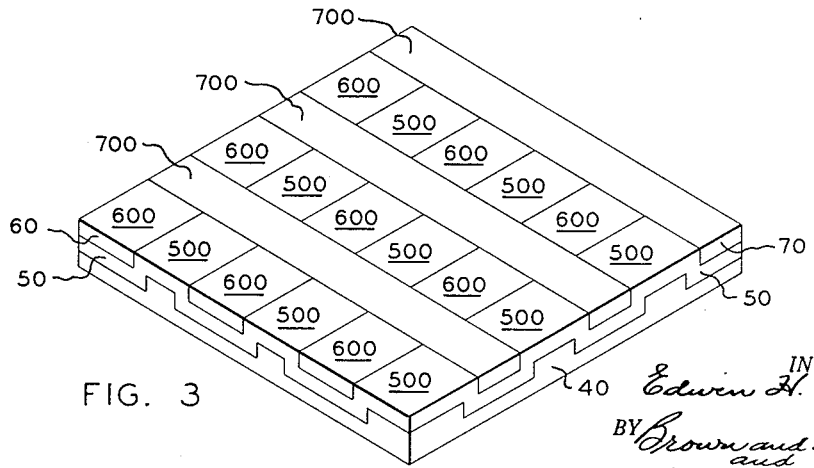
FIG. 3 is a diagrammatic perspective view of another embodiment of a photosensitive element employing screen elements in accordance with this invention.

A photosensitive screen element such as that shown in FIG. 3 may be prepared by coating a support layer 40 with a layer 50 containing a blue-sensitive emulsion and polarizing crystals of an appropriate color-providing substance. The polarizing crystals present in layer 50 may be oriented by the coating or doctoring operation, by stretching, or by any other method. A series of depressed sections or grooves is formed in said blue-sensitive layer 50 by an embossing operation and a green-sensitive emulsion 60 containing polarizing crystals of an appropriate color-providing substance is doctored into these grooves to provide the green-sensitive elements 600. Another embossing step is carried out to provide another set of spaced-apart depressed sections or grooves into each of which is doctored a red-sensitive emulsion 70 containing polarizing crystals of an appropriate color-providing substance. The polarizing crystals of such elemental portions 600 and 700 are substantially oriented by the doctoring step. The green- and red-sensitive elemental portions 600 and 700 may also contain a suitable yellow filter material, or such a filter material may be applied over these elemental portions.

In processing such a multicolor, screen photosensitive element, it is necessary to prevent diffusion of color-providing substances from layers underlying the elemental portions. This may be accomplished by various permeation controls to restrict permeation during the imbibition period to the elemental portions comprising the screen elements, such as by the use of nonpermeable, insulating or barrier layers, or by suitable control of the thickness of each emulsion layer, as well as other methods described in the cited copending applications. It is also preferable to space the image-receiving element from the screen photosensitive element so that the color-providing substances of each imagewise distribution will be diffused sidewise or laterally from the negative element whereby color-providing substances transported from adjacent elemental portions will overlap and provide mixtures of subtractive dyes on the image-receiving element.

Figure 4:
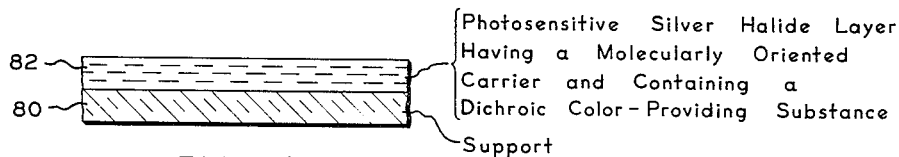
FIG. 4 is a diagrammatic cross-sectional view of a photosensitive element utilizing a further embodiment of this invention.

Referring to FIG. 4, there is illustrated a photosensitive element comprising a support layer 80 carrying a stratum 82 of a photosensitive silver halide emulsion comprising a molecularly oriented carrier and containing a dichroic color-providing substance. It will be understood that oriented emulsion layers such as shown in FIG. 4 may also be used in multilayer embodiments such as illustrated in FIG. 2.

The color providing substances which are transferred to the image-receiving element will be deposited in molecularly dispersed form and, therefore, ordinarily will not be polarizing. Where a positive color image is desired to be polarizing, a dichroic color-providing substance may be used with a suitably molecularly oriented, dyeable image-receiving material, e.g., an oriented polyvinyl alcohol stratum.

As an example of a liquid processing composition suitable for use with a dye developer, such as those of Formulae I, II or III, one may use an aqueous composition comprising:

| | Percent |
|---|---|
| Sodium hydroxide | 2.0 |
| Potassium bromide | 0.2 |
| Sodium carboxymethyl cellulose | 4.5 |

In certain instances, it may be desirable to use a small amount of an auxiliary developing agent, for example metol. The use of such an auxiliary developing agent may have an accelerating effect on development. It is used in a quantity insufficient to give appreciable negative density by itself.

In addition to obtaining increased speed by the use of polarizing crystals of color-providing substances, increased speed may also be obtained by the use of a reflecting layer, such as aluminum foil, behind the emulsion layer.

In all products employed in the practice of this invention, it is preferable to expose the photosensitive element from the emulsion side. It is, therefore, desirable to hold said photosensitive element and the image-receiving element together at one end thereof by fastening means not shown but comprising hinges, staples, or the like in such manner that the photosensitive element and the image-receiving element may be spread apart from their processing positions illustrated in FIG. 1. Where the film unit is of the roll film type, said photosensitive element and image-receiving element are wound into separate rolls and the free ends of said rolls are connected together in the manner described. A camera apparatus suitable for processing roll film of the type just mentioned is provided by the Polaroid Land Camera Model 95A, sold by Polaroid Corporation, Cambridge, Massachusetts, or similar camera structure such, for example, as the camera forming the subject matter of U.S. Patent No. 2,435,717. Camera apparatus of this type permits successive exposure of individual frames of the photosensitive element from the emulsion side thereof as well as individual processing of an exposed frame by bringing said exposed frame into superposed relation with a predetermined portion of the image-receiving element while drawing these portions of the film assembly between a pair of pressure rollers which rupture a container associated therewith and effect the spreading of the processing liquid released by rupture of said container, between and in contact with the exposed photosensitive frame and the predetermined, registered area of the image-receiving element.

The nature and construction of rupturable containers, such as container 10 of FIG. 1, is well understood in the art; see, for example, U.S. Patent No. 2,543,181, issued to Edwin H. Land on February 27, 1951, and U.S. Patent No. 2,634,886, issued to Edwin H. Land on April 14, 1953.

The liquid processing composition utilized to process the exposed photosensitive element comprises at least an aqueous solution, and may contain an alkaline reagent. If the liquid processing composition is to be applied to the exposed photosensitive element by being spread thereon, preferably in a relatively thin, uniform layer, it may also include a viscosity-increasing compound constituting a film-forming material of the type which, when said composition is spread and dried, will form a relatively firm and relatively stable film. A preferred film-forming material is a high molecular weight polymer such as a polymeric water-soluble ether which is inert to an alkaline solution, as, for example, a hydroxyethyl cellulose or sodium carboxymethyl cellulose. Other film-forming materials or thickening agents whose ability to increase viscosity is substantially unaffected when left in solution for a long period of time may also be used. The film-forming material is preferably contained in the processing composition in suitable quantities to impart to said composition a viscosity in excess of 1,000 centipoises at a temperature of approximately 24° C. and preferably of the order of 1,000 to 200,000 centipoises at said temperature. Illustrations of suitable liquid processing compositions may be found in the several patents and copending applications herein mentioned, and also in the example herein given. Under certain circumstances, it may be desirable to apply the liquid processing composition to the photosensitive element prior to exposure in accordance with the technique described in the copending application of Edwin H. Land, Serial No. 498,672, filed April 1, 1955.

The image-receiving element or material comprises an image-receiving layer of opaque or transparent material which is liquid permeable and dyeable fom alkaline solutions and which may be illustrated for purposes of simplicity as comprising a single sheet of permeable material, for example paper. This element, however, may comprise a support upon which at least one liquid-permeable and dyeable layer is mounted. The support layer may have a water-impermeable subcoat over which the stratum of permeable and dyeable material is applied. In certain instances, the dyeable layer may comprise a layer of liquid processing composition which is adapted to remain adhered to the support layer upon stripping.

A preferred material for the image-receiving layer is a nylon and preferably a nylon such as N-methoxymethyl polyhexamethylene adipamide which is available under the trade name of Nylon Type F8 From E. I. du Pont de Nemours & Co. Other materials suitable for image-receiving layers comprise a partially hydrolyzed polyvinyl acetate such as that commercially available under the trade name of Vinylite MA–28–18 from Bakelite Division, Carbide and Carbon Chemicals Co.; polyvinyl alcohol with or without plasticizers, baryta paper, i.e., a support having a baryta coating thereon; cellulose acetate with filler, as, for example, one-half cellulose acetate and one-half oleic acid; and other materials of a similar nature, as is well known in the art.

While a rupturable container 10, such as has been illustrated with the film unit of FIG. 1, provides a convenient means for spreading a liquid processing composition between layers of a film unit whereby to permit the processing to be carried out within a camera apparatus, the practices of this invention may be otherwise effected. For example, a photosensitive element, after exposure in suitable apparatus and while preventing further exposure thereafter to actinic light, may be removed from such apparatus and permeated with the liquid processing composition as by coating the composition on said photosensitive element or otherwise wetting said element with the composition, following which the permeated, exposed, photosensitive element, still without additional exposure to actinic light, is brought into contact with the image-receiving element for image formation in the manner heretofore described.

It is also to be understood that the invention may be successfully practticed without the use of a film-forming material in the liquid processing composition. As an illustration, a nonviscous liquid processing composition is particularly applicable with the processing technique last mentioned above and may be applied to the exposed photosensitive element by imbibition or coating practices and may be similarly applied to the image-receiving element before said elements are brought into superposed relation or contact for carrying out the transfer of mobile, diffusible color-providing substances.

The inventive concepts of this invention are also useful in the formation of multicolor images in accordance with the multilayer delayed transfer processes disclosed and claimed in the copending application of Edwin H. Land and Howard G. Rogers, Serial No. 565,135, filed February 13, 1956.

Similarly, the inventive concepts herein set forth are also adaptable for the formation of multicolored images in accordance with the photographic products and processes disclosed in U.S. Patent No. 2,647,049, issued July 28, 1953, to Edwin H. Land.

Throughout the specification and appended claims, the expression "positive image" should not be interpreted in a restricted sense since it is used primarily for purposes of illustration, in that it defines the image produced on the image-receiving layer as being reversed, in the positive-negative sense, with respect to the developed image in the photosensitive element. As an example of an alternative meaning for "positive image," assume that the photosensitive element is exposed to actinic light through a negative transparency. In this case the latent image in the photosensitive element will be a positive and the image produced on the image-receiving layer will be a negative. The expression "positive image" is intended to cover such an image produced on the image-receiving layer.

The expression "color" has been frequently used in the preceding portions of the specification. This expression is intended to include the use of one or more colors to obtain black.

Throughout the specification and claims, the expression "superposing" has been used. This expression is intended to cover the arrangement of two layers in overlying relation to each other either in face-to-face contact or in separated condition and including between them at least one layer or stratum of a material which may be a viscous liquid.

Since certain changes may be made in the above products and processes without departing from the scope of the invention herein involved, it is intended that all matter contained in the above description or shown in the accompanying drawing shall be interpreted as illustrative and not in a limiting sense.

What is claimed is:

1. In a process of forming transfer images in color comprising exposing a photosensitive element comprising at least one silver halide emulsion and a colored color-providing substance so positioned within said photosensitive element as to absorb light by which said silver halide emulsion is exposable, developing said exposed photosensitive element to provide an imagewise diffusable distribution of said color-providing substance, and transferring, by diffusion, at least a part of said imagewise distribution to a superposed image-receiving material to impart a color image to said image-receiving material, the improvement in which said colored color-providing substance is present in said photosensitive element during exposure in a form exhibiting substantially the same plane of polarization through the thickness of the layer containing said colored color-providing substance, whereby said colored color-providing substance absorbs less light during exposure and the layer containing said colored color-providing substance transmits light which otherwse would be absorbed by said colored color-providing substance.

2. A process as defined in claim 1, wherein said colored color-providing substance is a colored color coupler and said process includes the step of coupling said colored color coupler with the oxidation product of a silver halide developing agent to form said color image.

3. A process as defined in claim 1, wherein said colored color-providing substance is contained in a layer comprising said silver halide emulsion.

4. A process as defined in claim 1, wherein said photosensitive element comprises at least two selectively sensitized silver halide emulsion strata arranged in superposed relationship.

5. A process as defined in claim 1, wherein said colored color-providing substance is a dye developer, said dye developer being a compound which is both a silver halide developing agent and a dye.

6. A process as defined in claim 1, wherein said photosensitive element comprises at least two sets of minute, selectively sensitized elemental portions arranged in side-by-side relation to form a color screen, each of said elemental portions containing a colored color-providing substance in the form of polarizing crystals.

7. A process as defined in claim 1, wherein said image-receiving material is a layer comprising a polymer whose molecules have been oriented to substantial parallelism.

8. In a process of forming transfer images in color by diffusion transfer comprising exposing a photosensitive element comprising at least one silver halide emulsion and a colored color-providing substance so positioned within said photosensitive element as to absorb light by which said silver halide emulsion is exposable, developing said exposed photosensitive element to provide a diffusible imagewise distribution of said color-providing substance, and transferring, by diffusion, at least a part of said imagewise distribution to a superposed image-receiving material to impart a color image to said image-receiving material, the improvement in which said colored color-providing substance is molecularly dispersed in a layer comprising a polymer whose molecules have been oriented to substantial parallelism, said colored color-providing substance being correspondingly oriented, whereby said colored color-providing substance differentially absorbs the components of an incident beam of light depending upon the vibration directions of said components, whereby said colored color-providing substance absorbs less light during exposure and the layer containing said colored color-providing substance transmits light which otherwise would be absorbed by said colored color-providing substance.

9. In a process of forming transfer images in color by diffusion transfer comprising exposing a photosensitive element comprising at least one silver halide emulsion and a colored color-providing substance so positioned within said photosensitive element as to absorb light by which said silver halide emulsion is exposable, developing said exposed photosensitive element to provide a diffusible imagewise distribution of said color-providing substance, and transferring, by diffusion, at least a part of said imagewise distribution to a superposed image-receiving material to impart a color image to said image-receiving material, the improvement in which said colored color-providing substance is present in said photosensitive element during exposure in the form of polarizing crystals, said polarizing crystals transmitting light vibrating in the plane of orientation of said crystals, whereby said colored color-providing substance absorbs less light during exposure and the layer containing said colored color-providing substance transmits light which otherwise would be absorbed by said colored color-providing substance.

10. A process as defined in claim 9, wherein said colored color-providing substance is present in said photosensitive element in the form of needle-shaped, polarizing crystals.

11. A process as defined in claim 9, wherein said colored color-providing substance is present in said photosensitive element in the form of needle-shaped, polarizing crystals oriented to substantial parallelism.

12. A process as defined in claim 9, wherein said coloed color-providing substance is a dye.

13. A photographic product comprising a photosensitive element comprising at least one silver halide emulsion and a colored color-providing substance so positioned within said photosensitive element as to absorb light by which said slver halide emulsion is exposable, said colored color-providing substance being present in a form exhibiting substantially the same plane of polarization through the thickness of the layer containing sad colored color-providing substance; an image-receiving material associated with said photosensitive element; a rupturable container holding at least an aqueous alkaline liquid adapted to serve as a solvent for a silver halide developing agent; said color-providing substance being diffusible in said aqueous alkaline liquid; said photosensitive element, said image-receiving material and said container being held together so as to permit at least a portion of said photosensitive element and said image-receiving material to be superposed with said container so positioned as to be capable of being ruptured and releasing its liquid content for spreading between said photosensitive element and said image-receiving material; and a silver halide developing agent positioned within said product.

14. A photographic product as defined in claim 13, wherein said colored color-providing substance is molecularly dispersed in a layer comprising a polymer whose molecules have been oriented to substantial parallelism, said colored color-providing substance being correspondingly oriented.

15. A photographic product as defined in claim 13, wherein said colored color-providing substance is a dye developer, said dye developer being a compound which is both a silver halide developing agent and a dye.

16. A photographic product as defined in claim 13, wherein said colored color-providing substance is a dye.

17. A photographic product as defined in claim 13, wherein said colored color-providing substance is a colored color coupler, and the oxidation product of said silver halide developing agent is capable of coupling with said colored color coupler to form a dye.

18. A photographic product as defined in claim 13, wherein said colored color-providing substance is contained in a layer comprising said silver halide emulsion.

19. A photographic product as defined in claim 13, wherein said photosensitive element comprises at least two selectively sensitized silver halide emulsions.

20. A photographic product as defined in claim 13, wherein said image-receiving material comprises a polymer whose molecules have been oriented to substantial parallelism.

21. A photographic product comprising a photosensitive element comprising at least one silver halide emulsion and a colored color-providing substance so positioned within said photosensitive element as to absorb light by which said silver halide emulsion is exposable, said colored color-providing substance being present in the form of polarizing crystals which transmit light vibrating in the plane of orientation of said crystals whereby said light absorption is reduced and the layer containing said colored color-providing substance transmits light which otherwise would be absorbed by said colored color-providing substance; an image-receiving material associated with said photosensitive element; a rupturable container holding at least an aqueous alkaline liquid adapted to serve as a solvent for a silver halide developing agent; said color-providing substance being diffusible in said aqueous alkaline liquid; said photosensitive element, said image-receiving material and said container being held together so as to permit at least a portion of said photosensitive element and said image-receiving material to be superposed with said container so positioned as to be capable of being ruptured and releasing its liquid content for spreading between said photosensitive element and said image-receiving material; and a silver halide developing agent positioned within said product.

22. A photographic product as defined in claim 21, wherein said polarizing crystals are needle-shaped.

23. A photographic product as defined in claim 22, wherein said needle-shaped polarizing crystals are oriented to substantial parallelism.

24. A photographic product as defined in claim 21, wherein said colored color-providing substance is a dye developer, said dye developer being a compound which is both a silver halide developing agent and a dye.

References Cited in the file of this patent

UNITED STATES PATENTS

| | | |
|---|---|---|
| 2,298,058 | Land | Oct. 6, 1942 |
| 2,409,959 | Ryan et al. | Oct. 22, 1946 |
| 2,481,189 | Barnes | Sept. 6, 1949 |
| 2,484,818 | Dreyer | Oct. 18, 1949 |
| 2,614,926 | Land | Oct. 21, 1952 |
| 2,647,049 | Land | July 28, 1953 |
| 2,774,668 | Rogers | Dec. 18, 1956 |

UNITED STATES PATENT OFFICE
CERTIFICATE OF CORRECTION

Patent No. 2,997,390                                      August 22, 1961

Edwin H. Land

It is hereby certified that error appears in the above numbered patent requiring correction and that the said Letters Patent should read as corrected below.

Column 4, line 3, for "$(2d_\perp + d_{||}($" read -- $(2d_\perp + d_{||})$ --; column 5, line 75, for "magneta" read -- magenta --; column 6, line 55, for "through slot" read -- through a narrow slot --; column 8, line 23, for "suport" read -- support --; column 11, line 1, for "fom" read -- from --; line 15, for "From" read -- from --; line 44, for "practticed" read -- practiced --; column 13, line 50, for "slver" read -- silver --; line 53, for "sad" read -- said --.

Signed and sealed this 22nd day of May 1962.

(SEAL)
Attest:
ERNEST W. SWIDER                                            DAVID L. LADD
Attesting Officer                                                Commissioner of Patents